(12) United States Patent
Thibodeau

(10) Patent No.: US 11,660,801 B2
(45) Date of Patent: May 30, 2023

(54) STARWHEEL PREFORM ORIENTING APPARATUS

(71) Applicant: DT Inventions, Houston, TX (US)

(72) Inventor: James Alfred Thibodeau, Houston, TX (US)

(73) Assignee: DT Inventions, Houston, TX (US)

( * ) Notice: Subject to any disclaimer, the term of this patent is extended or adjusted under 35 U.S.C. 154(b) by 0 days.

(21) Appl. No.: 17/191,033

(22) Filed: Mar. 3, 2021

(65) Prior Publication Data

US 2022/0281153 A1    Sep. 8, 2022

(51) Int. Cl.
  *B29C 49/42*   (2006.01)
  *B65G 47/84*   (2006.01)
  *B29L 31/00*   (2006.01)

(52) U.S. Cl.
  CPC ........ *B29C 49/4205* (2013.01); *B65G 47/846* (2013.01); *B29L 2031/712* (2013.01)

(58) Field of Classification Search
  CPC ........... B29C 49/4205; B29L 2031/712; B65G 47/846
  See application file for complete search history.

(56) References Cited

U.S. PATENT DOCUMENTS

| | | | | |
|---|---|---|---|---|
| 2009/0243161 A1* | 10/2009 | Beale | ................. | B29C 49/4252 264/537 |
| 2011/0114452 A1 | 5/2011 | Zoppas et al. | | |

FOREIGN PATENT DOCUMENTS

| | | | | |
|---|---|---|---|---|
| AU | 2005203451 B2 * | 3/2012 | ......... | B29C 49/0073 |
| CN | 110605842 A * | 12/2019 | | |
| CN | 111216340 A * | 6/2020 | ......... | B29C 49/4205 |
| CN | 111283985 A * | 6/2020 | ......... | B29C 49/4205 |
| CN | 111283985 A | 6/2020 | | |
| EP | 3549744 A1 | 10/2019 | | |
| FR | 3101622 A1 * | 4/2021 | | |
| WO | WO-2007101309 A1 * | 9/2007 | ......... | B29C 49/0073 |

OTHER PUBLICATIONS

International Search Report issued in PCT/US2022/017057 dated May 20, 2022 (5 pages).
Written Opinion of the International Searching Authority issued in PCT/US2022/017057 dated May 20, 2022 (7 pages).

* cited by examiner

*Primary Examiner* — Gene O Crawford
*Assistant Examiner* — Lester Rushin, III
(74) *Attorney, Agent, or Firm* — Osha Bergman Watanabe & Burton LLP

(57) ABSTRACT

A preform orienting apparatus for a preform having an integral handle is disclosed. The preform orienting apparatus has a stationary outer guide comprising a friction strip configured to contact a portion of the preform and pick up the preform by the portion of the preform, and configured to rotate the preform, and a moving starwheel assembly comprising a plurality of lugs disposed on an underneath side of the moving starwheel, wherein at least one lug of the plurality of lugs is configured to stop rotation of the preform at a predisposed position of the integral handle.

19 Claims, 5 Drawing Sheets

STARWHEEL PREFORM ORIENTING APPARATUS

FIELD OF THE INVENTION

The present invention relates to a method and machine for forming a container. More specifically, the present invention relates to a method and device for forming a container from a preform with an integrated handle.

BACKGROUND OF INVENTION

Conventionally, numerous types of containers, including plastic bottles for holding fluids, are formed by blow-molding. An exemplary process can produce a plastic bottle, for example, a PET bottle. Such a bottle can be produced from a preform which has an elongated cylindrical body, which is connected to a neck section with a pour opening, in which the preform, which has been produced in a plastic injection process or an extrusion process, is placed in the mold cavity of a blow mold and inflated using a blow nozzle or stretch rod by an injection blow molding or injection stretch blow molding process.

The preform includes a body portion, a neck portion and an integral handle. A blow moulding machine for producing blown containers with an integrally formed handle is the machine including a preform injection moulding stage, a preform orientation stage, a preform conditioning stage and a blow moulding stage. What is needed as part of the preform orientation stage is a simple method for orienting the preform handle while the preform moves from one stage to another of the blow moulding machine.

SUMMARY OF INVENTION

In general, in one aspect, the invention relates to a preform orienting apparatus for a preform having an integral handle, having a stationary outer guide comprising a friction strip configured to contact a portion of the preform and pick up the preform by the portion of the preform, and configured to rotate the preform, and a moving starwheel assembly comprising a plurality of lugs disposed on an underneath side of the moving starwheel, wherein at least one lug of the plurality of lugs is configured to stop rotation of the preform at a predisposed position of the integral handle.

In general, in one aspect, the invention relates to a method for orienting a preform having an integral handle, including receiving a preform transported via guide rails, the preform comprising a threaded neck portion, a body, and an integral handle and being configured to be blown into a container, catching the preform by the threaded neck portion via a friction strip on a starwheel assembly of a preform orienting apparatus configured to orient the preform, rotating the preform until the integral handle is stopped by a lug disposed on an underside of a starwheel assembly, and orienting the preform, by way of the integral handle, in a predetermined orientation prior to heating the preform in an oven.

In general, in one aspect, the invention relates to a preform orienting apparatus for orienting preforms with an integrally formed handle, the apparatus including a stationary portion having an outer guide plate comprising a friction strip configured to contact a portion of the preform to pick up the preform transported on guide rails, and a rotating portion having a moving starwheel configured to rotate and orient the preform by the integrally formed handle. The moving starwheel has a plurality of lugs disposed on an underneath side of the moving starwheel, wherein each of the plurality of lugs is configured to stop rotation of the preform at a predisposed position of the integral handle.

Other aspects and advantages of the invention will be apparent from the following description and the appended claims.

DETAILED DESCRIPTION

Figure 1:
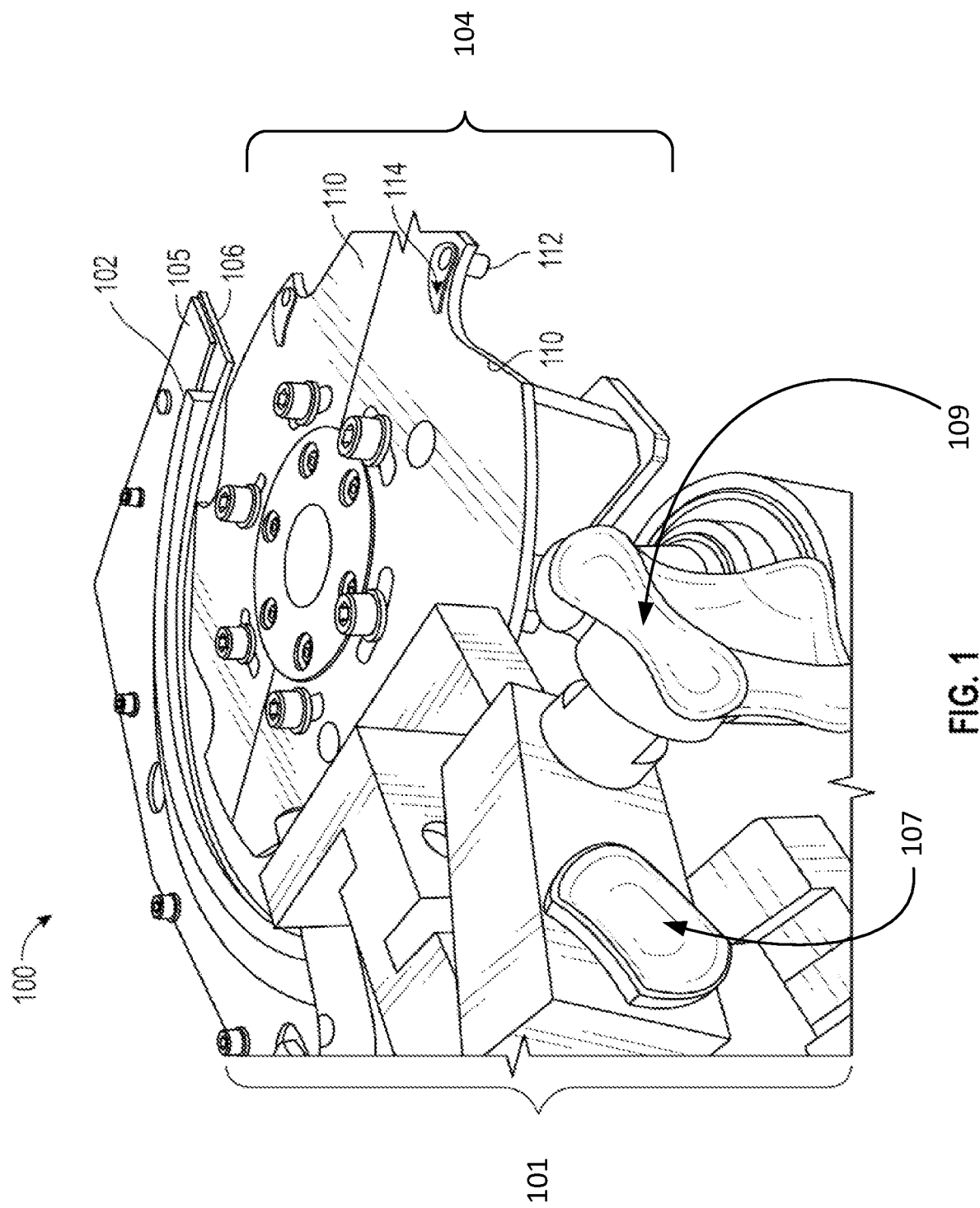
FIG. 1 shows a preform orienting apparatus in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description is demonstrative in nature and is not intended to limit the scope of the invention or its application of uses. There are a number of significant design features and improvements incorporated within the invention.

Injection blow molding is used for the production of hollow objects in large quantities. The main applications are bottles, jars, and other containers. In a pre-injection stage, the polymer is fed into the extruder and plasticizes plastic pellets into molten polymer. In an injection stage, the molten polymer is fed into a manifold where it is injected through nozzles into a hollow, heated preform mold. The preform mold forms the external shape and is clamped around a core rod which forms the internal shape of the preform. Next, in a blowing stage, the preform mold opens and the core rod is rotated and clamped into the hollow, chilled blow mold. The core rod opens and allows compressed air into the preform, which inflates into the finished product shape. After the cooling cycle, the blow mold opens and the core rod is rotated to the ejection position. The finished product is ejected off the core rod.

Stretch blow molding is a modification of injection blow molding process and is also referred to as injection stretch blow molding (ISBM). Stretch blow molding processes produce biaxial orientation in the blown article. Stretch blow molding provides for axial orientation by stretching the preform axially before or during blowing. This is accomplished by a stretch rod that is advanced axially inside the preform at a controlled rate. Stretch blow molding is divided into two different categories: single-stage and two-stages. Single-stage process is done using one machine, while in a two-stage process, preforms are premade prior to the blow molding process.

In single-stage injection stretch molding parison is injected from the extruder into preform mold where the plastic is cooled to form the preform. The preform is then reheated and placed in the bottle mold. The preform is stretched by extending the core rod. Compressed air is blown into the stretched parison to expand to the shape of the mold. The blown container is then cooled and ejected.

In the two-stage process, premade preforms are placed in preform heaters to allow them to soften. The mold is opened allowing softened preform to be inserted, after which the mold is closed. The preform is then stretched as described above. Compressed air is blown into the stretched preform to expand to the shape of the mold. The container is then cooled and ejected. The two-stage or reheat injection stretch blow molding process completely separates the preform injection molding operation from the blow molding operation. For example, the two operations may be carried out in different locations by different manufacturers, with a substantial time interval between them. On the other hand, the process involves two heating operations, resulting in a greater energy use and increased heat history in the polymer. Another disadvantage is the need to store and handle preforms.

Injection stretch blow molding processes use hollow preforms produced by injection molding. The preform is short and thick-walled relative to the finished blown article. The neck profile complete with screw thread is entirely formed by injection molding and is not modified by the blowing process. The other end of the preform is closed and typically dome shaped with a curved bottom portion. Further, the design and precision of the preform has a critical influence on the degree of orientation and quality of the blown article. The actual wall thickness and any profiling depends on the shape and size of the blown container. Like other preform processes, the finished blown article is free of seams, flash, and pinch-off scrap, and is characterized by precise neck dimensions. The injection molded preform may be converted to a blow molding either by the single-stage or the two-stage process.

An integrated apparatus and method for the production of a blow moulded container which includes an integrally formed handle is disclosed. Embodiments disclosed herein relate to one of the stages of the blow molding machine process, namely, the preform orienting stage. Specifically, embodiments disclosed herein are related to a preform orienting apparatus that ensures that the integrated handle of the preform enters the oven for heating at the same orientation each time. The preform orienting apparatus may be one stage of a multi-stage continuous, rotary, blow-molding machine for blowing preforms with or without integral handles into containers. More specifically, embodiments disclosed herein are directed to a starwheel shaped preform orienting apparatus having an outer an inner guide support plate with a rubber friction strip that grabs the preform by the threaded neck portion, and rotates the preform to orient the handle into a predisposed position.

The integral handle of the preform is made from a same material as the preform, and may be, for example, PET, or any thermoplastics material.

FIG. 1 shows a preform orienting apparatus (100) in accordance with one or more embodiments. As described above, the apparatus shown in FIG. 1 is one stage of the many stages of the blow-molding process described above. The preform orienting apparatus (100) is configured to orient the preform (shown in FIG. 4) by the integral handle of the preform so that each preform enters the next stage of the blow moulding machine (i.e., the heating ovens) at a predicted and same orientation in each instance. More specifically, FIG. 1 shows an apparatus that receives preforms traveling to the apparatus (100) resting on metal slats of a guide rail and orients the preforms for optimal disposition. Those skilled in the art will appreciate that the configuration shown in FIG. 1 is not meant to limit the scope of this disclosure, and that components may be added, omitted or combined to perform the same function of orienting the preform without departing from the scope herein.

As shown in FIG. 1, the preform orienting apparatus (100) includes a stationary portion (101) and a rotating portion (104). The stationary portion (101) is fixed and does not rotate with the rotating portion (104) of the machine and includes guide plates (105, 106) and a friction strip (102). Specifically, in one or more embodiments, the stationary portion (101) includes an upper outer guide plate (105) and a lower outer guide plate (106) with a friction strip (102) sandwiched in between. The friction strip (102) may be rubber or any other suitable material for grabbing or picking off the preform by the neck portion off of the guide rails on which the preforms are transported to the apparatus (100). The rotating portion (104) of the preform orienting apparatus (100) includes a starwheel assembly which rotates in a clockwise direction. The starwheel assembly includes two semi-circular halves made of flat portions (110) that connect to each other and are bolted or otherwise fixed onto a collar (108) underneath the flat portion (110) that also rotates. On the underside of the flat portions (110) are multiple lugs or pins (112), shown in more detail in the expanded view of the starwheel assembly shown in FIG. 2 below.

In one or more embodiments, each lug/pin (112) is placed within an adjustment channel (114). The adjustment channel (114) allows for adjustment of the placement of the lug/pin along any portion of the channel (114). In one or more embodiments, the adjustment channel is an opening in the starwheel assembly. The adjustment channel (114) may be wider at one end and tapered at an opposite end, or may be uniform in shape, and take any suitable shape or form that allows for the lug/pin to be moved/adjusted along the adjustment channel (114).

As noted above, the apparatus (100) of FIG. 1 receives preforms from guide rails. The preforms travel to the apparatus (100) via guide rails having two metal slats for transporting the preforms. Specifically, a handling ring (or handle ring) portion located at the base of the threaded neck portion of the preform rests on two metal slats (not shown) on either side and slides down the metal slats until the preform orienting apparatus is reached. There, the threaded neck portions of preforms are grabbed by friction strip (102) of the preform orienting apparatus (100). Knobs (107, 109) are used to widen or squeeze the metal slats closer together and/or to otherwise move the metal slats so that the preform is stable on the slats during transport to the preform orienting apparatus (100).

Those skilled in the art will appreciate that the components of the preform orienting apparatus are not limited to the configuration shown in FIG. 1, and that some components may be combined or omitted without departing from the scope disclosed herein. Further, those skilled in the art will appreciate that the preform orienting apparatus of FIG. 1 may be employed in or be a part of any continuously rotating blow-molding machine that requires orientation of the preform having an integral handle before the preform enters a pre-heating stage.

Figure 2:
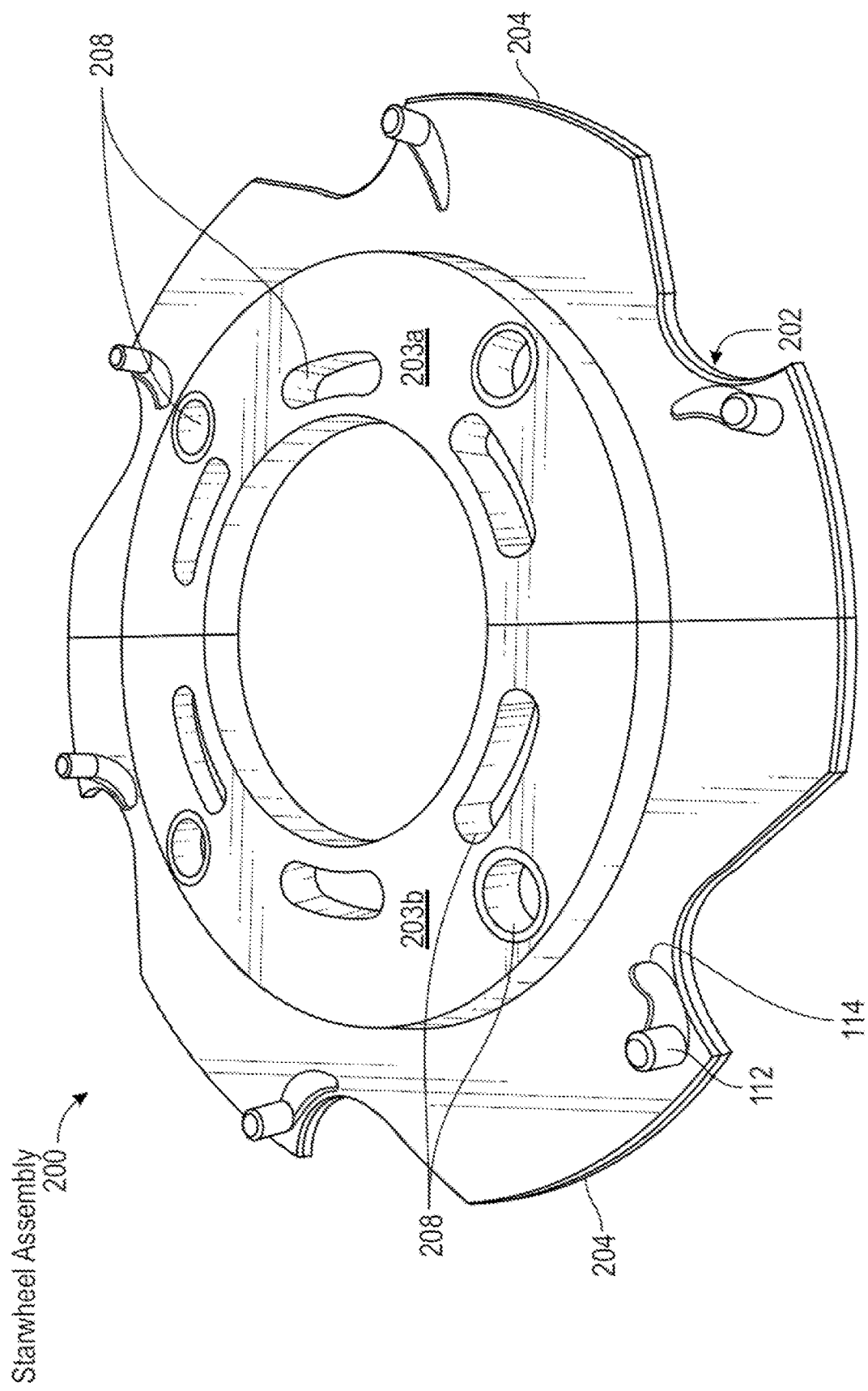
FIG. 2 shows a preform orienting apparatus with lugs and channels in accordance with one or more embodiments.

FIG. 2 shows the underneath side of the starwheel assembly (200), where the lugs/pins are disposed in accordance with one or more embodiments. More specifically, FIG. 2 shows an expanded view of the rotating portion (104) of the preform orienting apparatus (100) of FIG. 1. As can be seen in FIG. 2, the starwheel assembly includes two semicircular flat portions in a star-like shape with curved notches (202) adjacent to straight portions (204). More specifically, in one example embodiment, the starwheel assembly of the rotating portion (104) of the preform orienting apparatus includes six (6) straight portions (204) and five (5) curved notches (202), forming a star shaped assembly. Each lug/pin (112) is disposed at a corner where the curved portion (202) meets the straight portion (204), thereby having six (6) lugs/pins (112). Each adjustment channel (114) for each lug/pin (112) is an elongated opening/hole, tapered at one end, for adjustment of the placement of the lug/pin (114). In one or more embodiments, each channel (114) is formed along each curved notch (202) of the starwheel assembly. That is, the channel follows the curve in the curved notched portion of the starwheel assembly.

Those of ordinary skill in the art will appreciate that the lug/pin location on the starwheel orienting apparatus is dependent on how the preform integral handle should be oriented going into the oven. For example, the integral handle may be trailing the preform body such that when the preform comes out of the oven it is at a 2 o'clock position. Those skilled in the art will appreciate that the channels shown in the starwheel apparatus allow for the lug/pin to be adjusted to different positions to orient the preform by way of the integral handle in a desired manner, such that the when the preform enters and exists the oven it is oriented at a correct, predetermined position.

Also shown in FIG. 2, an inner circular layer exists on the underside of the two flat portions. That is, each flat half of the starwheel assembly has an inner layer of semi-circular portions (203a, 203b) that extends lower than the corresponding flat portion. That is, the semi-circular halves (203a, 203b) protrude from the flat surface of the flat star-shaped portions of the starwheel assembly. These semi-circular halves include a plurality of holes (208) or additional channels for bolts and/or other fixing connectors to affix the starwheel assembly to the collar, which is part of the rotating portion of the starwheel assembly (200).

Further, those skilled in the art will appreciate that the configuration of the starwheel assembly shown in FIG. 2 is only one example of the way in which the preform orienting apparatus may be envisaged. In other embodiments, the shape of the assembly shown in FIG. 2 may take other forms, such as a circular assembly, and is not limited to a star shape. Similarly, the number of lugs/pins, and corresponding channels is not limited to the configuration shown in FIG. 2 and may be any suitable number for orienting preforms received from a conveyor or guide rails in an assembly line fashion.

Figure 3:
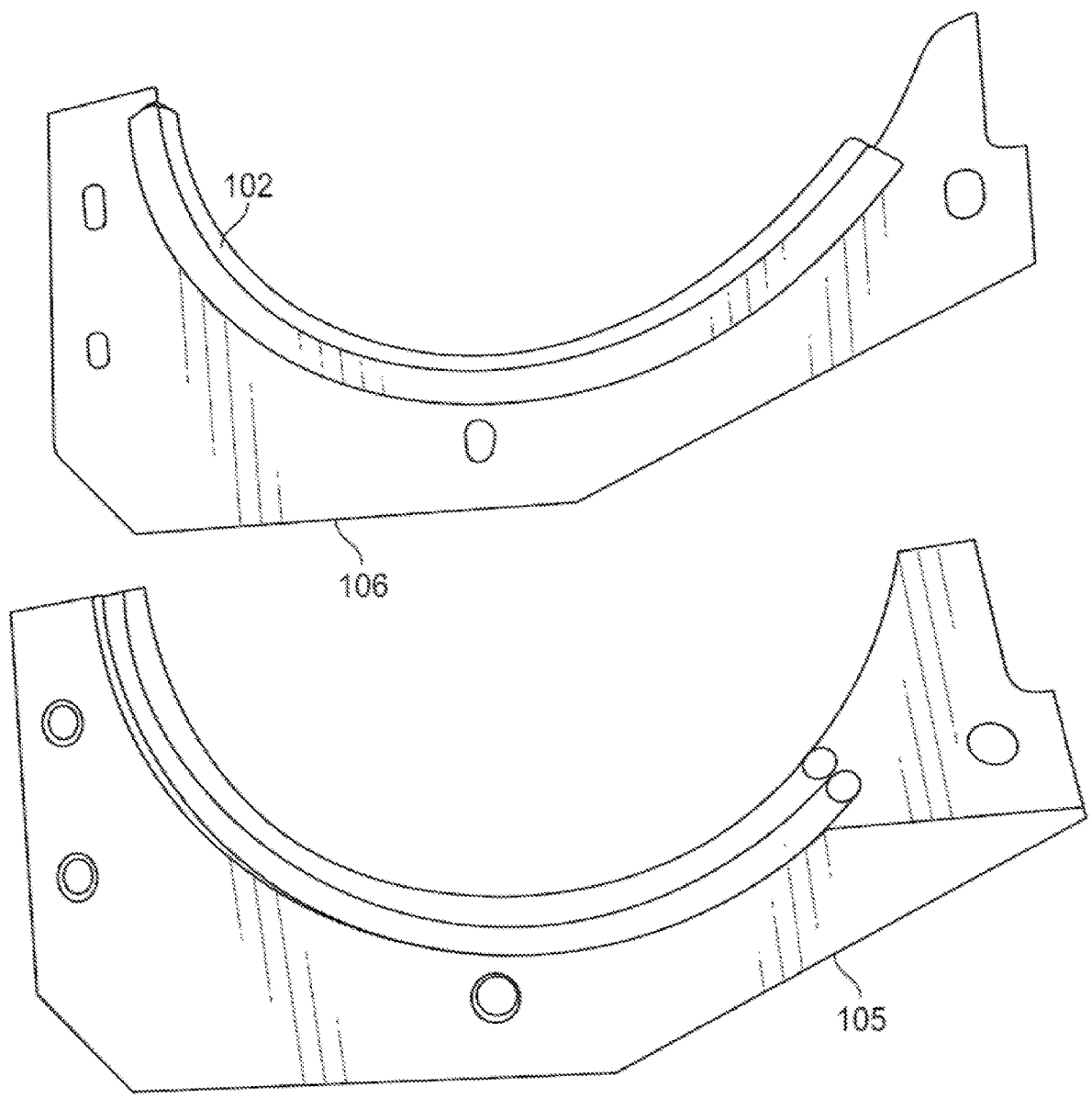
FIG. 3 shows upper and lower guide supports of the preform orienting apparatus in accordance with one or more embodiments.

FIG. 3 shows the upper and lower outer guide plates (105, 106) holding the friction strip (102) in accordance with one or more embodiments. These components (102, 105, 106) of FIG. 3 make up the stationary portion (101) of the preform orienting apparatus (100). In one or more embodiments, the outer guide plate formed of elements 105 and 106 is bolted to a stationary frame of the machine of the preform orienting apparatus. As can be seen in FIG. 3, a plurality of holes allow for the two plates (105, 106) to be placed one atop another and bolted or fixed together by other means such as screws, nails, or any other suitable connector. For example, 3 bolts may be used to fix the two plates together. When the two plates (105, 106) are sandwiched in this manner, the friction strip (102) is held in place and does not shift in position when the rubber strip contacts the preforms by the threaded neck portions to grab the preforms off of the guide rails/metal slats and orient the preforms by the preform integral handles.

Those skilled in the art will appreciate that the upper and lower outer guide plates provide some room/leeway in order to move the friction strip when necessary. For example, if a portion of the friction strip is worn after long use, the friction strip may be pushed or pulled to adjust the portion of the strip that grabs the preform off of the guide rails so that a less worn portion of the friction strip may be positioned at the point of transfer of the preform to the preform orienting apparatus. In other words, the friction strip may be moved inward more by loosening the bolts or other connectors that fix the two outer guide plates together. However, in order for the friction strip to be replaced, the upper and lower outer guide plates would need to be disassembled from their fixed position in which they sandwich the friction strip.

Figure 4:
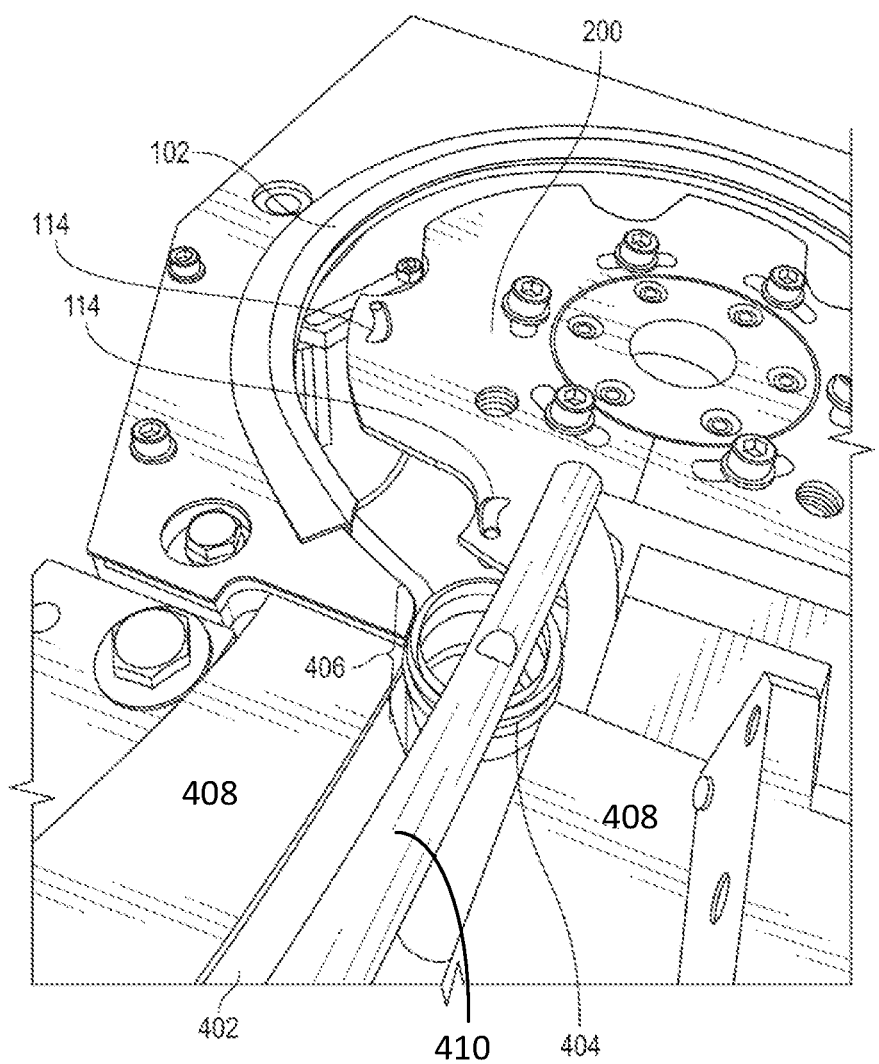
FIG. 4 shows an alternate view of the preform orienting apparatus with lugs and channels in accordance with one or more embodiments.

FIG. 4 shows the preform orienting apparatus from a different perspective than FIG. 1 in accordance with one or more embodiments. Specifically, FIG. 4 shows the preform orienting apparatus as it is encountered as a stage of the blow moulding machine with a preform (404) being delivered via guide rails having metal slats (402) to the starwheel assembly (200). Before the preform reaches the preform orienting apparatus stage of the machine, the preform is loaded onto the metal slats of the guide rails (402). From this stage, the preform is brought via the guide rail to the preform orienting apparatus, or the starwheel apparatus shown in FIGS. 1 and 3.

As can more clearly be seen in FIG. 4, as the preform (404) is transported to the preform orienting apparatus (100), the handle ring portion (not shown) of the preform just below the threaded neck portion (406) rests/sits upon two metal slats 408. In accordance with one or more embodiments, these metal slats 408 are adjustable and may be pushed closer together or widened to accommodate the threaded neck portion (406) of preforms. Further, a metal rod (410) holds the preform down so that it does not pop out of the metal slats (408). Those skilled in the art will appreciate that the rod (410) may be omitted or replaced with any other suitable structure for applying light weight to the preform to keep it in place.

Although not shown, the integral handle of the preform is located on the preform, underneath one of the metal slats 408. When the preform orienting apparatus (100) receives the preform, the threaded neck portion (406) of the preform is caught by the friction strip (102) and the preform is nested into the curved portion (202) of the starwheel assembly (200). The preform then makes its way around the outer guide plate and rotates until the preform integral handle (not shown) is stopped by a lug/pin (not shown in FIG. 4) on the underneath side of the starwheel assembly (200). Other components shown in FIG. 4 that are the same as those shown in FIG. 1 are not discussed again for sake of brevity. Details of how the preform is oriented are discussed below in FIG. 5.

Figure 5:
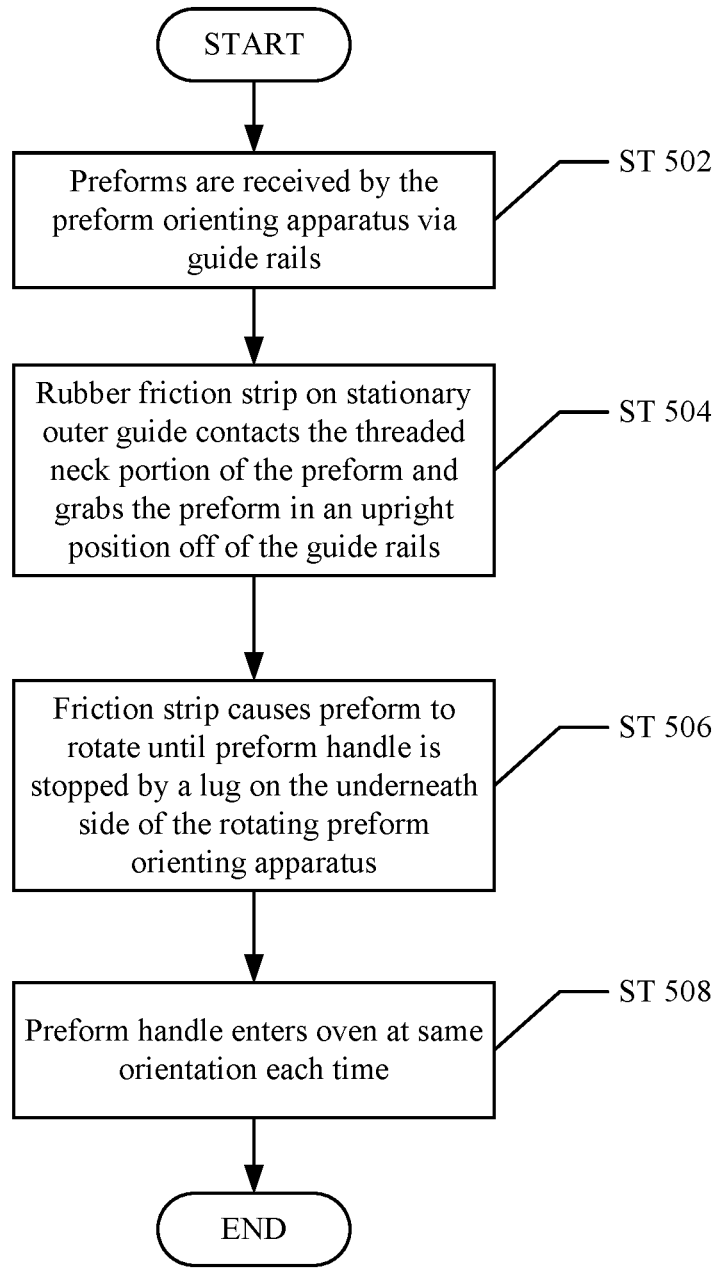
FIG. 5 shows a flowchart for orienting a preform in accordance with one or more embodiments.

FIG. 5 shows a flowchart for a method of orienting a preform in accordance with one or more embodiments, at the preform orienting stage of the blow moulding machine. That is, the process of FIG. 5 takes place after the preform is loaded onto the guide rails having the metal slats for transporting the preform to the starwheel apparatus. Further, one or more blocks in FIG. 5 may be performed by one or more components as described in FIGS. 1-4 above. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, in an assembly line fashion, preforms with integral handles are transported via guide rails to the preform orienting apparatus portion of the machine (ST 502). Specifically, the handling ring portion of the preforms rest on metal slats of the guide rails and are transported to the preform orienting apparatus via the adjustable metal slats. The preforms may, in one or more embodiments, slide down the metal slats to the preform orienting apparatus. Alternatively, the metal slats may be movable to transport the preforms to the preform orienting apparatus. At this stage, in ST 504, the friction strip disposed on a stationary outer guide of the preform orienting apparatus "grabs" the preform by the neck portion. That is, in one or more embodiments, the rubber of the friction strip comes into contact with the threaded neck portion of the preform and picks up the preform by the neck portion. The preform then gently rotates while it is being transported to the next stage of the blow moulding machine. In ST 506, the preform rotates until it is stopped by at least one lug (also called a pin) disposed on the underneath side of the moving starwheel. This lug/pin is a protrusion on the underside of the starwheel apparatus that catches/engages the preform integral handle and stops the rotation of the preform at a specific disposition such that the integral handle enters the next stage of the machine (i.e., the heating oven) at the same orientation each time for each preform that is delivered via the preform orienting apparatus (ST 508). In other words, the lug acts as a stopper to stop the handle of the preform so that it is opposite the grippers.

Further, in one or more embodiments, the preform orienting apparatus is configured to orient the preform before the preform enters a first oven. The first oven includes a first heating bank comprising a plurality of heating elements, and each of the plurality of heating elements are individually movable in a direction perpendicular to a direction in which the preform passes through the first oven. Further, a heat output of each of the plurality of heating elements are individually controlled by a first heating bank controller. A second oven may also be part of the machine for blowing a container from a preform with an integral handle. The second oven includes a second heating bank comprising a plurality of heating elements, and each of the plurality of heating elements are individually movable in a direction perpendicular to a direction in which the preform passes through the second oven. A heat output of each of the plurality of heating elements are individually controlled by a second heating bank controller.

The preform with the integral handle is heated, the preform having an attachment notch, in a first oven, stretching the preform to move the handle attachment notch away from a handle attachment point or another handle attachment notch, closing a first mold having a first mold recess and a second mold having a second mold recess around the preform, and blowing compressed air into the preform using a blow nozzle or stretch rod with holes. The stretch rod is inserted into the preform to stretch the preform body to a length of the blow container.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A preform orienting apparatus for a preform having an integral handle, comprising:
   a stationary outer guide comprising a friction strip configured to contact a portion of the preform and pick up the preform by the portion of the preform, and configured to rotate the preform;
   a moving starwheel assembly comprising a plurality of lugs disposed on an underneath side of the moving starwheel, wherein at least one lug of the plurality of lugs is configured to stop rotation of the preform at a predisposed position of the integral handle.

2. The apparatus of claim 1, wherein the friction strip is a rubber strip.

3. The apparatus of claim 1 wherein the portion of the preform that is contacted by the friction strip is the threaded neck portion of the preform.

4. The apparatus of claim 1, wherein the moving starwheel comprises a plurality of adjustment channels, each one of the plurality of adjustment channels corresponding to one of the plurality of lugs, the plurality of adjustment channels allowing for adjustment of placement of each of the plurality of lugs on the moving starwheel.

5. The apparatus of claim 1, wherein the stationary outer guide consists of an upper guide plate and a lower guide plate, wherein the friction strip is sandwiched in between the upper and lower guide plates.

6. The apparatus of claim 5, wherein the upper guide plate and the lower guide plate are bolted together to sandwich the friction strip in between.

7. A method for orienting a preform having an integral handle, comprising:
   receiving a preform transported via guide rails, the preform comprising a threaded neck portion, a body, and an integral handle and being configured to be blown into a container;
   catching the preform by the threaded neck portion via a friction strip on a starwheel assembly of a preform orienting apparatus configured to orient the preform;
   rotating the preform until the integral handle is stopped by a lug disposed on an underside of a starwheel assembly; and
   orienting the preform, by way of the integral handle, in a predetermined orientation prior to heating the preform in an oven.

8. The method of claim 7, wherein the friction strip is sandwiched between an upper outer guide plate and a lower outer guide plate of the starwheel assembly.

9. The method of claim 8, wherein the friction strip is a rubber strip.

10. The method of claim 7, wherein the lug is disposed in an adjustment channel that allows for adjustment of the placement of the lug on the starwheel assembly.

11. A preform orienting apparatus for orienting preforms with an integrally formed handle, the apparatus comprising:
- a stationary portion having an outer guide plate comprising a friction strip configured to contact a portion of the preform to pick up the preform transported on guide rails; and
- a rotating portion having a moving starwheel configured to rotate and orient the preform by the integrally formed handle,
  - the moving starwheel comprising a plurality of lugs disposed on an underneath side of the moving starwheel, wherein each of the plurality of lugs is configured to stop rotation of the preform at a predisposed position of the integral handle.

12. The apparatus of claim 11, wherein the rotating portion of the preform orienting apparatus further comprises: a rotating collar onto which the moving starwheel is fixed to transport the preform oriented at the predisposed position to at least one oven.

13. The apparatus of claim 11, wherein the moving starwheel further comprises straight portions and curved notches, the preform being configured to be nestled in one of the curved notches after being picked up by the friction strip.

14. The apparatus of claim 13, wherein the moving starwheel comprises a plurality of adjustment channels, each one of the plurality of adjustment channels corresponding to one of the plurality of lugs, the plurality of adjustment channels allowing for adjustment of placement of each of the plurality of lugs on the moving starwheel.

15. The apparatus of claim 14, wherein the plurality of adjustment channels are each formed along one of the curved notches.

16. The apparatus of claim 11, wherein the friction strip contacts a threaded neck portion of the preform to pick up the preform from metal slats of the guide rails.

17. The apparatus of claim 11, wherein the outer guide plate comprises an upper outer guide plate and a lower outer guide plate between which the friction strip is sandwiched, wherein the upper and lower outer guide plates are bolted together.

18. The apparatus of claim 11, wherein the friction strip is a rubber strip.

19. The apparatus of claim 11, wherein the preform orienting apparatus is part of a continuous, rotary, blow-molding machine for blowing preforms with integrated handles into containers.

* * * * *